(12) United States Patent
Kobayashi et al.

(10) Patent No.: US 8,878,812 B2
(45) Date of Patent: Nov. 4, 2014

(54) SIGNAL PROCESSING CIRCUIT FOR ELECTROSTATIC CAPACITY TYPE TOUCH SENSOR

(75) Inventors: Kazuyuki Kobayashi, Midori (JP); Tatsuya Suzuki, Kumagaya (JP); Kumiko Fukai, Gunma (JP); Yasuhiro Kaneta, Isesaki (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 935 days.

(21) Appl. No.: 12/837,029

(22) Filed: Jul. 15, 2010

(65) Prior Publication Data

US 2011/0012863 A1    Jan. 20, 2011

(30) Foreign Application Priority Data

Jul. 15, 2009    (JP) ................................. 2009-166438

(51) Int. Cl.
  *G06F 3/045*    (2006.01)
  *G06F 3/044*    (2006.01)
  *G06F 3/0354*   (2013.01)

(52) U.S. Cl.
  CPC ............ *G06F 3/044* (2013.01); *G06F 3/03547* (2013.01)
  USPC ...................................................... 345/174

(58) Field of Classification Search
  CPC ...... G06F 3/044; G06F 3/03547; G06F 3/045
  USPC .......... 345/174, 173; 178/18.03, 18.05–18.07
  See application file for complete search history.

(56) References Cited

U.S. PATENT DOCUMENTS

| | | | | |
|---|---|---|---|---|
| 5,305,017 | A  * | 4/1994 | Gerpheide | 345/174 |
| 2008/0006453 | A1 * | 1/2008 | Hotelling | 178/18.06 |
| 2009/0095541 | A1 * | 4/2009 | Lee | 178/18.03 |
| 2010/0295559 | A1 * | 11/2010 | Osoinach | 324/658 |

FOREIGN PATENT DOCUMENTS

| | | |
|---|---|---|
| JP | 2005-190950 | 7/2005 |
| JP | 2009-005050 | 1/2009 |
| WO | 2009/007500 A1 | 1/2009 |

* cited by examiner

*Primary Examiner* — Chanh Nguyen
*Assistant Examiner* — Tsegaye Seyoum

(57) ABSTRACT

There is offered a signal processing circuit for an electrostatic capacity type touch sensor capable of detecting a larger number of locations with a smaller number of touch pads as well as improving noise immunity. A selection circuit selects either a signal from a combination of the first and second kinds of touch pads outputted through the first and second output terminals CO1 and CO2 in a touch panel or a signal from a combination of the third and fourth kinds of touch pads outputted through the third and fourth output terminals CO3 and CO4. An electric charge amplifier outputs first and second output voltages V1 and V2 corresponding to a difference between capacitances of the touch pads on the touch panel based on the signals from the selected combination. A delta sigma type A/D converter converts the first and second output voltages V1 and V2 into digital signals.

20 Claims, 12 Drawing Sheets

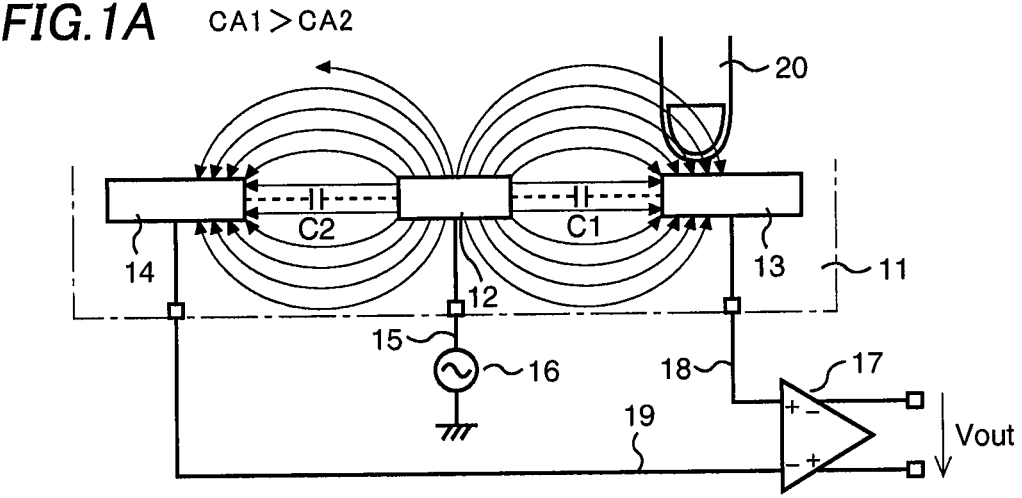
FIG.1A  CA1 > CA2
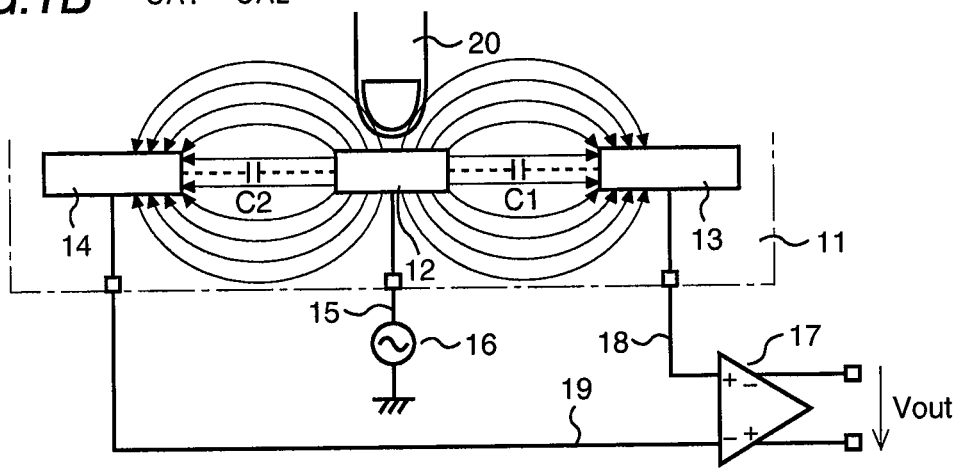
FIG.1B  CA1 = CA2
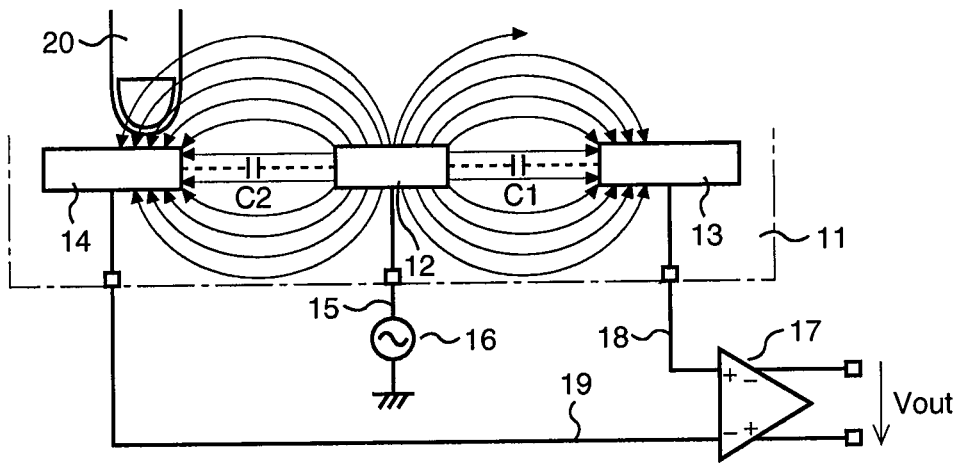
FIG.1C  CA1 < CA2

CHARGE ACCUMULATION MODE

CHARGE TRANSFER MODE

FIG.5A  CA1 < CA2
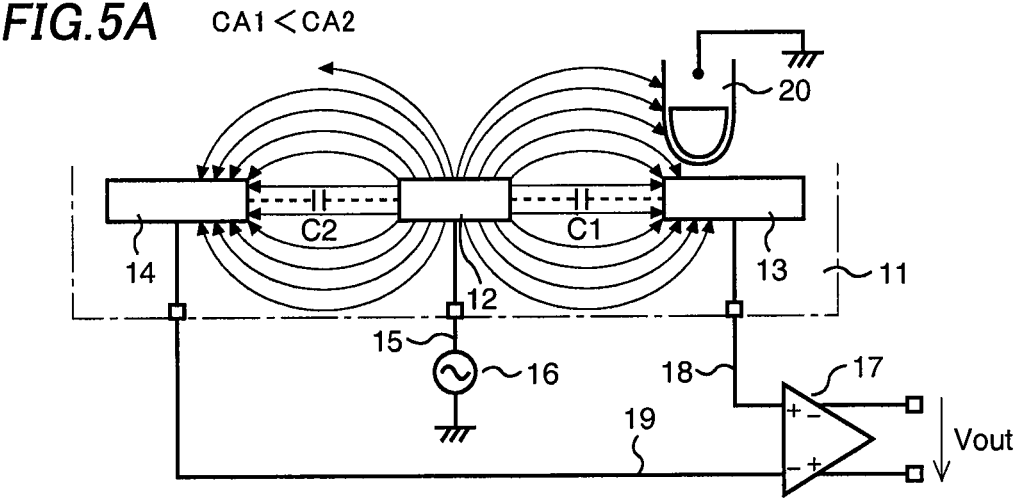
FIG.5B  CA1 = CA2
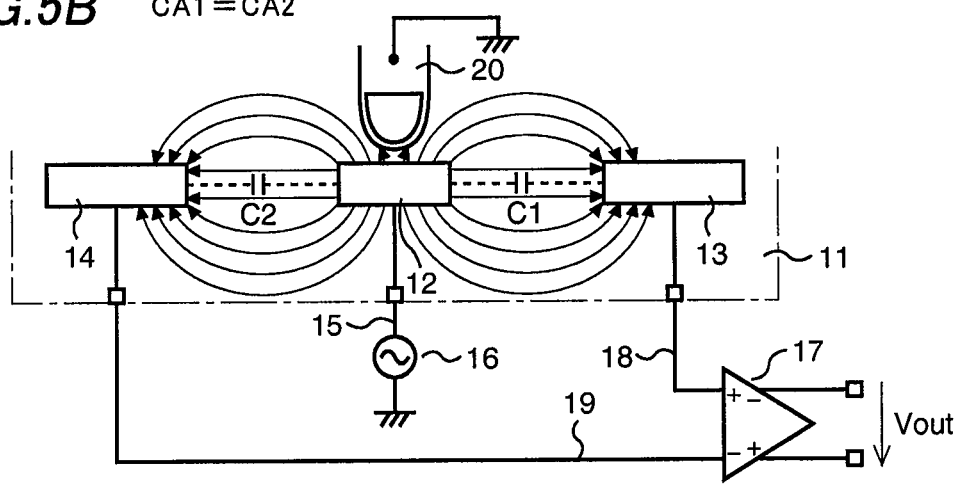
FIG.5C  CA1 > CA2
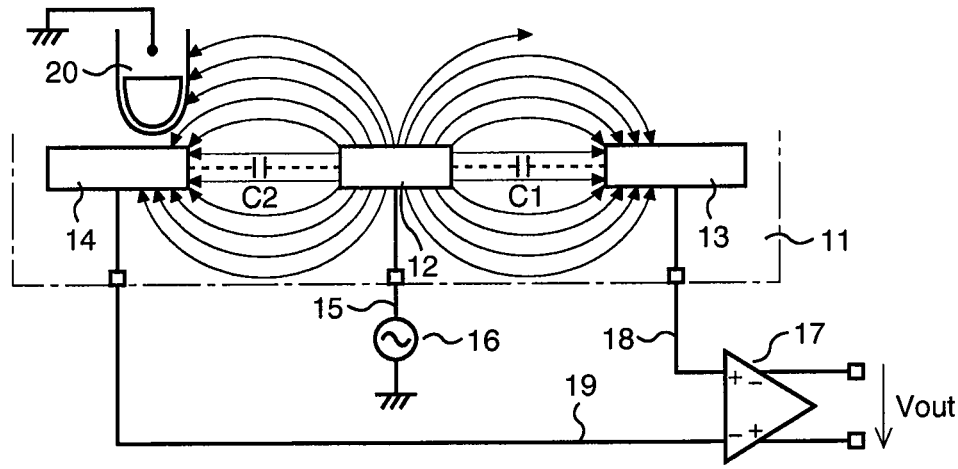

SIGNAL PROCESSING CIRCUIT FOR ELECTROSTATIC CAPACITY TYPE TOUCH SENSOR

CROSS-REFERENCE OF THE INVENTION

This application claims priority from Japanese Patent Application No. 2009-166438, the content of which is incorporated herein by reference in its entirety.

BACKGROUND OF THE INVENTION

1. Field of the Invention

This invention relates to a signal processing circuit for an electrostatic capacity type touch sensor.

2. Description of the Related Art

The electrostatic capacity type touch sensor has been known as an input device to various kinds of electronic devices such as a mobile phone, a portable audio device, a portable game console, a television and a personal computer.

A conventional electrostatic capacity type touch sensor is explained referring to FIG. 14 and FIG. 15. A touch pad 61 is formed on a PCB (Printed Circuit Board) substrate 60 so that an electrostatic capacitor 62 (capacitance C) is formed between the touch pad 61 and the PCB substrate 60, as shown in FIG. 14. The touch pad 61 is connected to a non-inverting input terminal (+) of a comparator 63 through a wiring 64. A reference voltage Vref is applied to an inverting input terminal (−) of the comparator 63. A constant current power supply 65 is connected to the wiring 64 that connects between the touch pad 61 and the non-inverting input terminal (+) of the comparator 63.

Operations of the electrostatic capacity type touch sensor are explained referring to FIG. 15. When a finger 66 of an operator is far away from the touch pad 61, a capacitance associated with the touch pad 61 is C. In this case, a voltage at the touch pad 61 increases from 0 V in a reset state as the electrostatic capacitor 62 is charged with a constant current from the constant current power supply 65. An output voltage of the comparator 63 is inverted when the voltage at the touch pad 61 reaches the reference voltage Vref. A length of time from the reset state to the inversion of the comparator 63 in this case is referred to as t1.

When the finger 66 of the operator approaches the touch pad 61, on the other hand, the capacitance associated with the touch pad 61 increases or decreases to C+C'. The variation C' is a capacitance of a capacitor formed between the finger 66 of the operator and the touch pad 61. As a result, the length of time that the voltage at the touch pad 61 takes from 0 V to the reference voltage Vref increases to t2 (t2>t1). That is, it is possible to detect whether the finger 66 of the operator has touched the touch pad 61 or not, based on a difference (t2−t1) in the length of time taken by the transition from the reset state to the inversion of the comparator 63. In other words, the touch pad 61 can be used as an ON/OFF switch for data input.

Technologies mentioned above are disclosed in Japanese Patent Application Publications No. 2005-190950, for example.

In the conventional touch sensor, however, there is a problem that the voltage at the touch pad 61 is varied to cause malfunctioning when a noise is applied to the touch pad 61.

In addition, when the touch pad 61 is used as a two-state switch, an amount of data in the detection of the touch position is limited.

SUMMARY OF THE INVENTION

The invention provides a signal processing device that includes a touch panel and a signal processing circuit for the touch panel. The touch panel includes a plurality of pairs of touch pads, each of the touch pads is a first kind of touch pad, a second kind of touch pad, a third kind of touch pad or a fourth kind of touch pad, and each of the pairs of touch pads includes two touch pads of a single kind or two touch pads of two different kinds. The touch panel also includes an excitation pad disposed between neighboring two of the pairs of touch pads. The signal processing circuit includes an alternating current power supply providing the excitation pad with an alternating voltage, an electric charge amplifier generating a first output voltage corresponding to a difference between a capacitance of a first capacitor formed between the excitation pad and the first kind of touch pad and a capacitance of a second capacitor formed between the excitation pad and the second kind of touch pad and generating a second output voltage corresponding to a difference between a capacitance of a third capacitor formed between the excitation pad and the third kind of touch pad and a capacitance of a fourth capacitor formed between the excitation pad and the fourth kind of touch pad, and a delta sigma type A/D converter converting each of the first and second output voltages generated by the electric charge amplifier into a digital value.

BRIEF DESCRIPTION OF THE DRAWINGS

FIGS. 1A, 1B and 1C show principles of an electrostatic capacity type touch sensor according to embodiments of this invention.

FIGS. 5A, 5B and 5C show principles of an electrostatic capacity type touch sensor according to the embodiments of this invention.

DETAILED DESCRIPTION OF THE INVENTION

Figure 2:
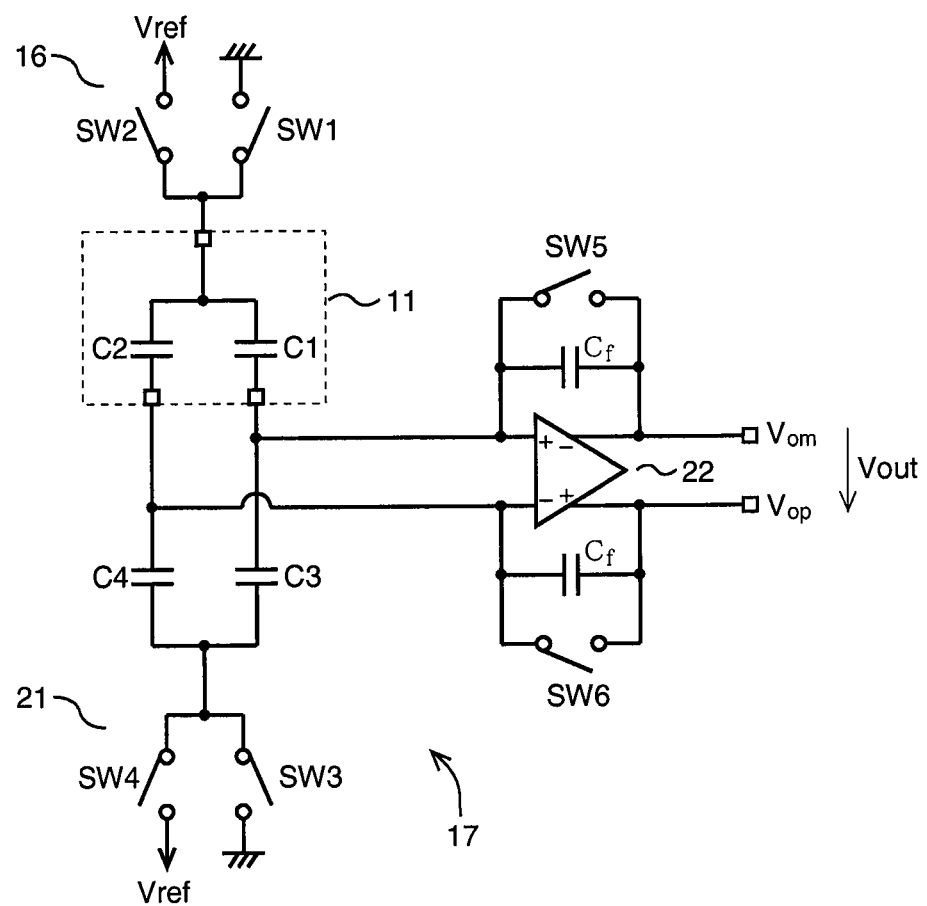
FIG. 2 is a circuit diagram of an electric charge amplifier.

A signal processing circuit for an electrostatic capacity type touch sensor according to the embodiments of this invention is hereafter described referring to the drawings. First, basic principles of the signal processing circuit are explained referring to FIGS. 1A through 5C.

An excitation pad 12, a first touch pad 13 and a second touch pad 14 are disposed on a substrate 11 such as a PCB substrate in a way that the excitation pad 12 is interposed between the first and second touch pads 13 and 14, as shown in FIGS. 1A, 1B and 1C. A dielectric layer (not shown) is formed between the excitation pad 12 and each of the first and second touch pads 13 and 14.

That is, a first electrostatic capacitor C1 is formed of the excitation pad 12 and the first touch pad 13. Similarly, a second electrostatic capacitor C2 is formed of the excitation pad 12 and the second touch pad 14. The first electrostatic capacitor C1 has a capacitance CA1, while the second electrostatic capacitor C2 has a capacitance CA2. It is preferable that the capacitances CA1 and CA2 are set to be equal to each other in an initial state. Since the excitation pad 12 and the first and second touch pads 13 and 14 are electrodes, it is preferable that surfaces of these electrodes are covered with a dielectric material such as plastic or ceramic, or an insulating material such as wood or rubber.

On the other hand, an alternating current power supply 16 that provides the excitation pad 12 with an alternating voltage through a wiring 15 is provided on a side of the signal processing circuit (IC). Amplitude of the alternating voltage is referred to as an excitation voltage Vref. Also, there is provided an electric charge amplifier 17. The first touch pad 13 is connected to a non-inverting input terminal (+) of the electric charge amplifier 17 through an wiring 18, while the second touch pad 14 is connected to an inverting input terminal (−) of the electric charge amplifier 17 through a wiring 19.

The electric charge amplifier 17 generates a voltage corresponding to a difference between the capacitance CA1 of the first capacitor C1 formed between the excitation pad 12 and the first touch pad 13 and the capacitance CA2 of the second capacitor C2 formed between the excitation pad 12 and the second touch pad 14.

Figure 3A:
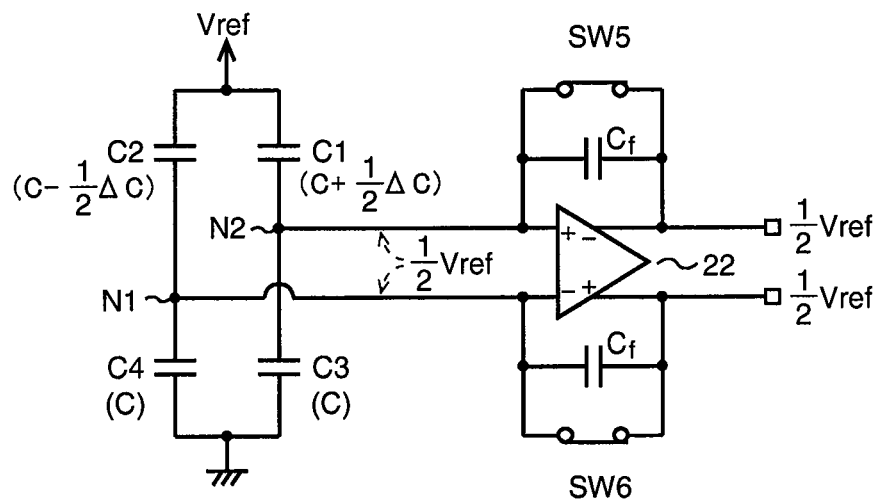
FIGS. 3A and 3B show operations of the electric charge amplifier.
Figure 3B:
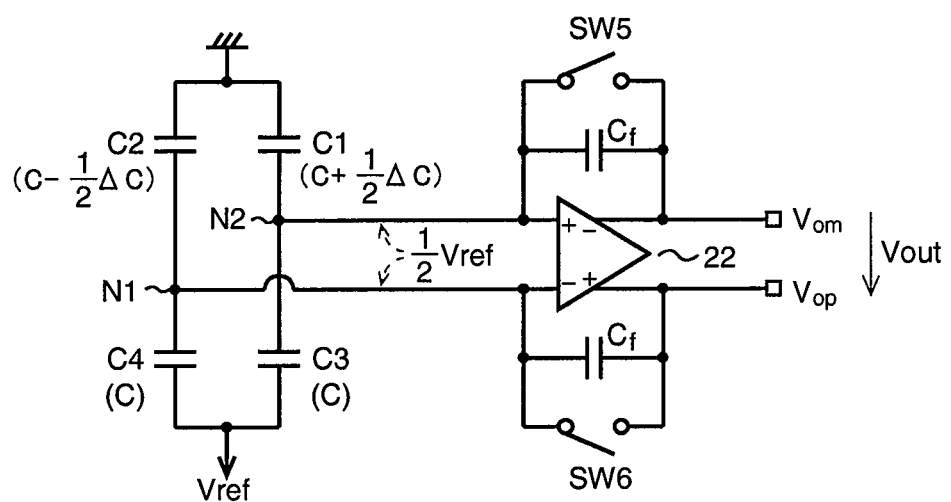

An example of a concrete structure of the electric charge amplifier 17 is described hereafter referring to FIG. 2, FIG. 3A and FIG. 3B. The first capacitor C1 and the second capacitor C2 are formed on the substrate 11 that is depicted as a portion encircled by a dashed line in FIG. 2. Portions of the structure shown in FIG. 2 except for the substrate 11 make the signal processing circuit.

The alternating current power supply 16 is formed of switches SW1 and SW2 that are switched alternately. The alternating current power supply 16 outputs a ground voltage (0 V) when the switch SW1 is closed and the switch SW2 is opened, and outputs the excitation voltage Vref (positive voltage) when the switch SW1 is opened and the switch SW2 is closed. In this case, the alternating current power supply 16 outputs a clock signal voltage alternating between the excitation voltage Vref (H level) and 0 V (L level).

A third electrostatic capacitor C3 is connected in series with the first electrostatic capacitor C1, while a fourth electrostatic capacitor C4 is connected in series with the second electrostatic capacitor C2. It is preferable that capacitances CA3 and CA4 of the electrostatic capacitors C3 and C4, respectively, are equal to each other and approximately equal to the capacitances CA1 and CA2.

An alternating current power supply 21, that is similar to the alternating current power supply 16, is connected to a connecting node between the third and fourth electrostatic capacitors C3 and C4. The alternating current power supply 21 is formed of switches SW3 and SW4 that are switched alternately. The alternating current power supply 21 outputs the ground voltage (0 V) when the switch SW3 is closed and the switch SW4 is opened, and outputs the excitation voltage Vref (positive voltage) when the switch SW3 is opened and the switch SW4 is closed. The alternating current power supply 16 and the alternating current power supply 21 output the clock signal voltages that are opposite in phase to each other.

A wiring drawn out from a connecting node N2 between the first and third electrostatic capacitors C1 and C3 is connected to a non-inverting input terminal (+) of an ordinary differential amplifier 22, while a wiring drawn out from a connecting node N1 between the second and fourth electrostatic capacitors C2 and C4 is connected to an inverting input terminal (−) of the differential amplifier 22.

A feedback capacitor Cf is connected between an inverting output terminal (−) and the non-inverting input terminal (+) of the differential amplifier 22, while an identical feedback capacitor Cf is connected between a non-inverting output terminal (+) and the inverting input terminal (−) of the differential amplifier 22. Each of the feedback capacitors Cf has a capacitance CAf.

A switch SW5 is connected between the inverting output terminal (−) and the non-inverting input terminal (+) of the differential amplifier 22, while a switch SW6 is connected between the non-inverting output terminal (+) and the inverting input terminal (−) of the differential amplifier 22. The switches SW5 and SW6 are switched simultaneously. That is, when the switches SW5 and SW6 are closed, the inverting output terminal (−) and the non-inverting input terminal (+) of the differential amplifier 22 are short-circuited while the non-inverting output terminal (+) and the inverting input terminal (−) of the differential amplifier 22 are short-circuited.

A voltage difference between an output voltage Vom from the inverting output terminal (−) of the differential amplifier 22 and an output voltage Vop from the non-inverting output terminal (+) of the differential amplifier 22 is represented by Vout (=Vop−Vom). The electric charge amplifier 17 is structured to include the differential amplifier 22 and the switched capacitor circuit including the switches SW5 and SW6 and the feedback capacitors Cf as described above.

Next, operations of the circuit structured as described above will be explained referring to FIGS. 3A and 3B. The circuit has a charge accumulation mode and a charge transfer mode that alternate a multitude of times.

In the charge accumulation mode that is shown in FIG. 3A, the excitation voltage Vref is applied to the first and second electrostatic capacitors C1 and C2 by opening SW1 and closing SW2 of the alternating current power supply 16. Also the ground voltage (0 V) is applied to the third and fourth electrostatic capacitors C3 and C4 by opening SW4 and closing SW3 of the alternating current power supply 21.

Also, SW5 and SW6 are closed. With this, the inverting output terminal (−) and the non-inverting input terminal (+) of the differential amplifier 22 are short-circuited while the non-inverting output terminal (+) and the inverting input terminal (−) are short-circuited. As a result, a voltage at the node N1 (node of the wiring connected to the inverting input terminal (−)), a voltage at the node N2 (node of the wiring connected to the non-inverting input terminal (+)), a voltage at the inverting output terminal (−) and a voltage at the non-inverting output terminal (+) all become ½ Vref. Here, a common mode voltage of the differential amplifier 22 is ½ Vref, which is a half of the excitation voltage Vref.

Next, in the charge transfer mode that is shown in FIG. 3B, the ground voltage (0 V) is applied to the first and second electrostatic capacitors C1 and C2 by closing SW1 and opening SW2 of the alternating current power supply 16. Also, the excitation voltage Vref is applied to the third and fourth electrostatic capacitors C3 and C4 by closing SW4 and opening SW3 of the alternating current power supply 21. Also, SW5 and SW6 are opened.

After that, the circuit resumes to the charge accumulation mode shown in FIG. 3A, and then turns to the charge transfer mode again.

In this case, CA3=CA4=C, where C is each of the capacitances CA1 and CA2 in the initial state. When a finger 20 of an operator approaches the touch pad 13 or 14, there is caused a capacitance difference ΔC between the capacitances CA1 and CA2. That is, CA1−CA2=ΔC. Then, equations CA1=C+½ΔC and CA2=C−½ΔC hold.

In the charge accumulation mode, $$\text{Amount of Electric Charges at } N1 = \quad [\text{Equation 1}]$$

$$\left(C - \frac{1}{2}\Delta C\right) \cdot \left(-\frac{1}{2}Vref\right) + C \cdot \left(\frac{1}{2}Vref\right) + CAf \cdot 0$$

where (C−½ΔC)·(−½ Vref) represents an amount of electric charges stored in C2, C·(½ Vref) represents an amount of electric charges stored in C4 and CAf·0 (=0) represents an amount of electric charges stored in Cf.

In the charge transfer mode, $$\text{Amount of Electric Charges at } N1 = \quad [\text{Equation 2}]$$

$$\left(C - \frac{1}{2}\Delta C\right) \cdot \left(\frac{1}{2}Vref\right) +$$

$$C \cdot \left(-\frac{1}{2}Vref\right) + CAf \cdot \left(Vop - \frac{1}{2}Vref\right)$$

where (C−½ΔC)·(½ Vref) represents an amount of electric charges stored in C2, C·(−½ Vref) represents an amount of electric charges stored in C4, and CAf·(Vop−½ Vref) represents an amount of electric charges stored in Cf.

[Equation 1]=[Equation 2] holds, since the amount of electric charges at the node N1 in the charge accumulation mode is equal to the amount of electric charges at the node N1 in the charge transfer mode according to the law of conservation of electric charge.

Following equation is obtained by solving [Equation 1]=[Equation 2] for Vop.

$$Vop = \left(1 + \frac{\Delta C}{CAf}\right) \cdot \frac{1}{2} Vref \quad [\text{Equation 3}]$$

Similarly, following equation is obtained by applying the law of conservation of electric charge to the electric charges at the node N2 and solving the resulting equation for Vom.

$$Vom = \left(1 - \frac{\Delta C}{CAf}\right) \cdot \frac{1}{2} Vref \quad [\text{Equation 4}]$$

Vout is obtained from [Equation 3] and [Equation 4].

$$Vout = Vop - Vom = \frac{\Delta C}{CAf} \cdot Vref \quad [\text{Equation 5}]$$

Figure 4:
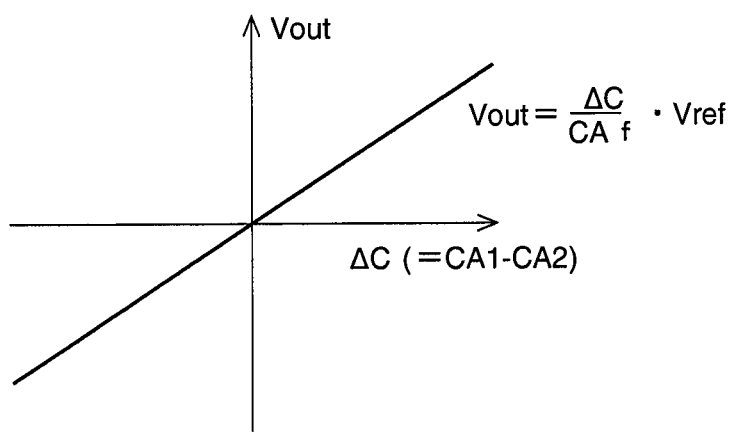
FIG. 4 shows input/output characteristics of the electric charge amplifier.

That is, it is understood that the output voltage Vout of the electric charge amplifier 17 varies proportionally to the capacitance difference ΔC between the capacitances CA1 and CA2, as shown in FIG. 4.

Principles of the operations of the touch sensor are hereafter explained referring to FIGS. 1A, 1B and 1C. In the following explanation, the capacitances CA1 and CA2 of the capacitors C1 and C2, each formed between the excitation pad 12 and each of the first and second touch pads 13 and 14, respectively, are equal to each other, that is CA1=CA2=C, in the initial state in which the finger 20 of the operator is far away from the touch pads 13 and 14. The explanation is given based on a dielectric model in which the finger 20 of the operator is regarded as a dielectric that is electrically floating.

First, when the finger 20 of the operator approaches the first touch pad 13 as shown in FIG. 1A, an electric field between the first touch pad 13 and the excitation pad 12 is varied so that the capacitance CA1 of the capacitor C1 formed between the first touch pad 13 and the excitation pad 12 becomes larger compared with the capacitance CA2 of the capacitor C2 formed between the second touch pad 14 and the excitation pad 12 (CA1>CA2).

This is because the number of lines of electric force originating from the excitation pad 12 and terminating at the first touch pad 13 is increased by that the finger 20 of the operator approaches the first touch pad 13. In this case, the output voltage Vout of the electric charge amplifier 17 becomes positive (+) as derived from the equation 5. The same result is obtained when a dielectric such as an eraser approaches the first touch pad 13 instead of the finger 20 of the operator.

When the finger 20 of the operator is placed right above the excitation pad 12 as shown in FIG. 1B, the capacitance CA1 and the capacitance CA2 become equal to each other (CA1=CA2). In this case, the output voltage Vout of the electric charge amplifier 17 becomes 0 V.

When the finger 20 of the operator approaches the second touch pad 14 as shown in FIG. 1C, an electric field between the second touch pad 14 and the excitation pad 12 is varied so that the capacitance CA2 of the capacitor C2 formed between the second touch pad 14 and the excitation pad 12 becomes larger compared with the capacitance CA1 (CA2>CA1). In this case, the output voltage Vout of the electric charge amplifier 17 becomes negative (−) as derived from the equation 5.

The touch sensor described above can be used as an ON/OFF switch, since the output voltage Vout of the electric charge amplifier 17 is turned to the positive (+) voltage when the finger 20 of the operator approaches the first touch pad 13. Besides, the output voltage Vout of the electric charge amplifier 17 varies linearly with ΔC. That is, the closer the finger 20 of the operator approaches to the first touch pad 13, the larger becomes the positive output voltage Vout. Conversely, the closer the finger 20 of the operator approaches to the second touch pad 14, the larger becomes an absolute value of the negative output voltage Vout. Therefore, linear detection (analog detection) of the touch position of the finger 20 of the operator is made possible by utilizing the characteristics described above.

In addition, noise immunity can be improved with the touch sensor described above, since differential capacitance detection is adopted. That is, when a noise is applied to the first and second touch pads 13 and 14, an influence of the noise on the first touch pad 13 and an influence of the noise on the second touch pad 14 are cancelled out by each other so that the influence of the noise is suppressed from appearing in the output voltage Vout of the electric charge amplifier 17. Furthermore, since there is no influence of parasitic capacitances of the first and second touch pads 13 and 14 and the wirings 15, 18 and 19, no restriction is imposed on patterning of the touch pads and the like, enabling arbitrary patterning.

Above explanation is based on the dielectric model in which the finger 20 of the operator is regarded as a dielectric material. When the finger 20 of the operator is grounded, on the other hand, an electric field shielding model applies. In this case, the finger 20 of the operator serves to shield the electric field so that the relative magnitude of the capacitance CA1 to the capacitance CA2 is reversed.

That is, in the electric field shielding model, when the finger 20 of the operator approaches the first touch pad 13, the number of the lines of electric force originating from the excitation pad 12 and terminating at the first touch pad 13 is decreased because a part of the lines of electric force originating from the excitation pad 12 terminates at the finger 20 of the operator as shown in FIG. 5A. As a result, the capacitance CA1 becomes smaller compared with the capacitance CA2 (CA1<CA2).

When the finger 20 of the operator is placed right above the excitation pad 12 as shown in FIG. 5B, the capacitance CA1 and the capacitance CA2 become equal to each other (CA1=CA2).

As shown in FIG. 5C, when the finger 20 of the operator approaches the second touch pad 14, the number of the lines of electric force originating from the excitation pad 12 and terminating at the second touch pad 14 is decreased because a part of the lines of electric force originating from the excitation pad 12 terminates at the finger 20 of the operator. As a result, the capacitance CA2 becomes smaller compared with the capacitance CA1 (CA1>CA2).

Which of the dielectric model and the electric field shielding model applies is determined depending on the electrical state of the finger 20 of the operator or its alternative such as a pen or an eraser. However, there is no difference in that the touch position can be detected by the changes in the capacitances since only difference in the case where the electric field shielding model applies from the case where the dielectric model applies is that the relative magnitude of the capacitance CA2 to that of the capacitance CA1 is reversed. The signal processing circuit according to each of the embodiments of this invention described below is explained based on the dielectric model.

A signal processing circuit according to a first embodiment of this invention using the basic principles described above will be explained. The signal processing circuit according to the first embodiment is a touch sensor that enables detecting eight or more than eight touch positions on a touch panel with four inputs.

Figure 6:
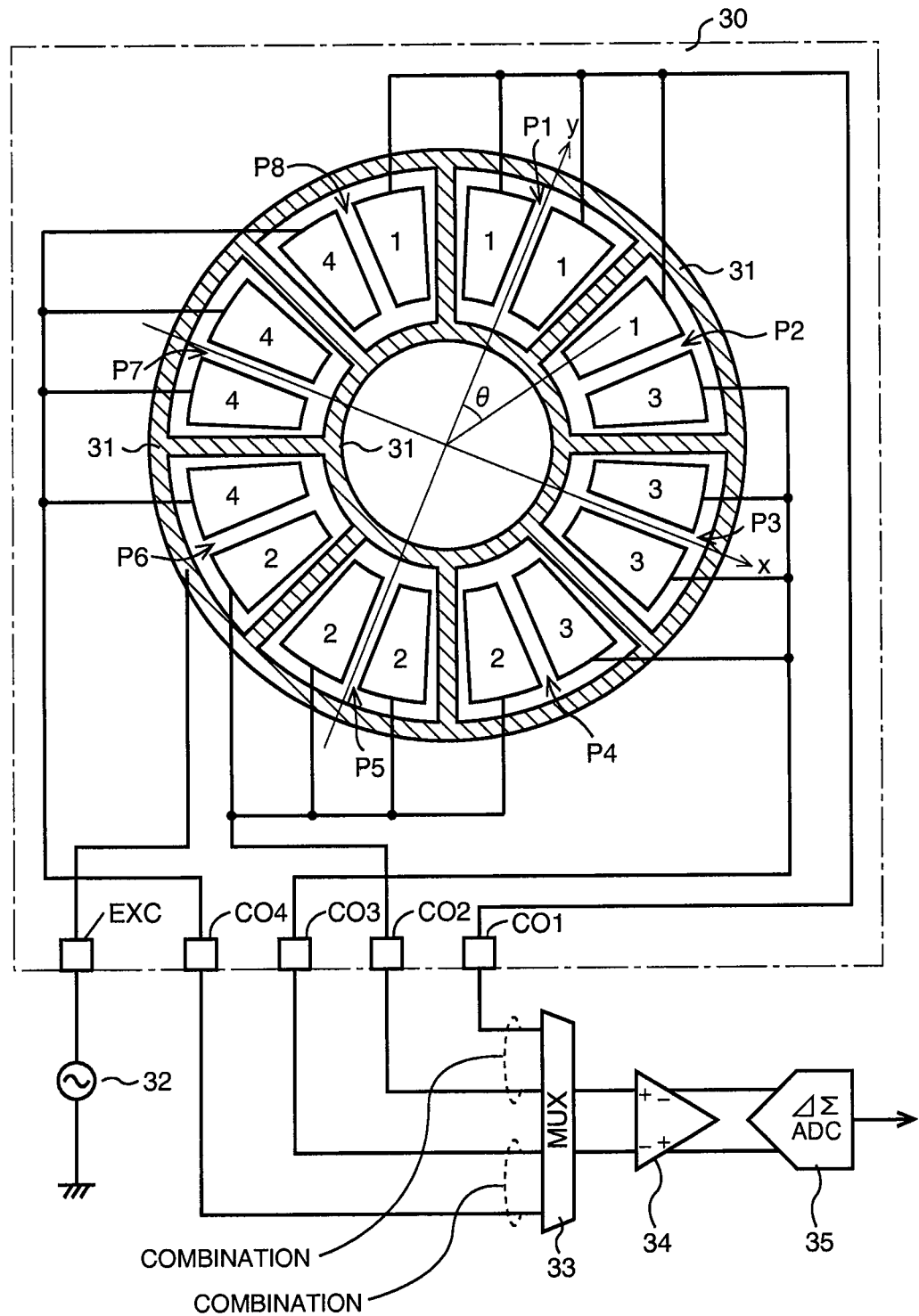
FIG. 6 shows an electrostatic capacity type touch sensor and its signal processing circuit according to a first embodiment of this invention.

First, a structure of the touch panel is described referring to FIG. 6. Four kinds of touch pads (electrodes) 1-4, that are a first kind, a second kind, a third kind and a fourth kind of touch pads, are provided on a substrate 30 such as a PCB substrate. Pairs of touch pads made of one or two kinds of touch pads selected out of the first through fourth kinds of touch pads 1-4 are arrayed in a ring form.

A first through eighth pairs of touch pads (1, 1), (1, 3), (3, 3), (3, 2), (2, 2), (2, 4), (4, 4), and (4, 1) are disposed in clockwise order in an example shown in FIG. 6. The first pair (1, 1) represents a pair composed of the first kind of touch pad 1 and another first kind of touch pad 1, while the second pair (1, 3) represents a pair composed of the first kind of touch pad 1 and the third kind of touch pad 3. Each of the rest of the pairs represents the similar structure. There are included pairs of touch pads composed of a single kind of touch pads such as (1, 1), (2, 2), (3, 3) and (4, 4).

Each of the pairs of touch pads composed of a single kind of tough pads are depicted as two separate touch pads in the example shown in FIG. 6 so that they have the same shape as the pairs of touch pads composed of two kinds of touch pads. However, the pairs of touch pads composed of a single kind of touch pads may be shaped in a single touch pad. For example, the first pair of touch pads (1, 1) may be formed of a single first kind of touch pad 1.

Each of the first through eighth pairs of touch pads corresponds to each of first through eighth locations P1-P8, respectively. An excitation pad (electrode) 31 is placed between neighboring pairs of touch pads. The excitation pad 31 corresponds to the excitation pad 12 shown in FIG. 1A to FIG. 1C. The touch pads of the same kind, for example, four of the first kind of touch pads 1, are connected together with a wiring. Each of the same kinds of touch pads is connected to corresponding each of first through fourth output terminals CO1-CO4, respectively. The excitation pad 31 is connected to an excitation terminal EXC through a wiring.

Next, a structure of the signal processing circuit is explained. An alternating current power supply 32 is connected to the excitation terminal EXC and the excitation pad 31 is provided with an alternating voltage. Each of the first through fourth output terminals CO1-CO4 is connected to corresponding each of four input terminals of a selection circuit 33. The selection circuit 33 selects either a signal from a combination of the first and second kinds of touch pads 1 and 2 outputted through the first and second output terminals CO1 and CO2 or a signal from a combination of the third and fourth kinds of touch pads 3 and 4 outputted through the third and fourth output terminals CO3 and CO4.

An electric charge amplifier 34 is provided in a stage subsequent to the selection circuit 33. The electric charge amplifier 34 is the same circuit as the electric charge amplifier 17, and is formed of a differential amplifier and a switched capacitor circuit. That is, the electric charge amplifier 34 generates a voltage (analog value) corresponding to a difference between a capacitance of a first capacitor formed between the excitation pad 31 and a touch pad of one kind out of the combination selected by the selection circuit 33 and a capacitance of a second capacitor formed between the excitation pad 31 and a touch pad of another kind out of the combination selected by the selection circuit 33 (Refer to the equation 5.).

That is, when the combination of the first and second kinds of touch pads 1 and 2 is selected, the electric charge amplifier 34 generates a first output voltage V1 corresponding to a difference between a capacitance of a first capacitor formed between the excitation pad 31 and the first kind of touch pad 1 and a capacitance of a second capacitor formed between the excitation pad 31 and the second kind of touch pad 2. The capacitance of the first capacitor and the capacitance of the second capacitor are set to be equal to each other in the initial state in which the finger of the operator is far away from any of the touch pads.

Similarly, when the combination of the third and fourth kinds of touch pads 3 and 4 is selected, the electric charge amplifier 34 generates a second output voltage V2 corresponding to a difference between a capacitance of a third capacitor formed between the excitation pad 31 and the third kind of touch pad 3 and a capacitance of a fourth capacitor formed between the excitation pad 31 and the fourth kind of touch pad 4. The capacitance of the third capacitor and the capacitance of the fourth capacitor are set to be equal to each other in the initial state in which the finger of the operator is far away from any of the touch pads. A delta sigma type A/D converter 35 that converts the analog value of the output voltage of the electric charge amplifier 34 into a digital value is provided in a stage subsequent to the electric charge amplifier 34. Note that the selection circuit 33 may be removed and instead two electric charge amplifiers each corresponding to each of the combinations of the two kinds of touch pads may be provided.

Operations of the touch sensor described above are explained referring to Table 1.

TABLE 1

| Location | Pair of Touch Pads | Output of Electric Charge Amplifier (in Phase 1) | Output of Electric Charge Amplifier (in Phase 2) |
|---|---|---|---|
| P1 | 11 | + | 0 |
| P2 | 13 | + | + |
| P3 | 33 | 0 | + |
| P4 | 32 | − | + |
| P5 | 22 | − | 0 |
| P6 | 24 | − | − |
| P7 | 44 | 0 | − |
| P8 | 41 | + | − |

The selection circuit 33 is controlled by a control circuit so that it selects the combination of the first and second kinds of touch pads 1 and 2 in a first phase (phase 1) and selects the combination of the third and fourth kinds of touch pads 3 and 4 in a subsequent phase (phase 2). Suppose the finger of the operator touches the first location P1, that is a center of the first pair of touch pads (1, 1), and the combination of the first and second kinds of touch pads 1 and 2 is selected in the phase 1. According to the principles described above, the electric charge amplifier 34 outputs a positive (+) voltage because the capacitance of the capacitor formed between the excitation pad 31 and the first kind of touch pad 1 is increased.

In the phase 2, on the other hand, the combination of the third and fourth kinds of touch pads 3 and 4 is selected. In this case, the electric charge amplifier 34 outputs 0 V. This is because the finger of the operator touches the first pair of touch pads (1, 1) and there is no difference between the capacitance of the capacitor formed between the excitation pad 31 and the third kind of touch pad 3 and the capacitance of the capacitor formed between the excitation pad 31 and the fourth kind of touch pad 4. Therefore, the output of the electric charge amplifier 34 in the phase 1 and in the phase 2 is represented as (+, 0).

Next, when the finger of the operator touches the second location P2, that is a center of the second pair of touch pads (1, 3), the electric charge amplifier 34 outputs the positive (+) voltage in the phase 1 because the capacitance of the capacitor formed between the excitation pad 31 and the first kind of touch pad 1 increase. The electric charge amplifier 34 also outputs the positive (+) voltage in the phase 2 because the capacitance of the capacitor formed between the excitation pad 31 and the third kind of touch pad 3 is increased. Therefore, the output of the electric charge amplifier 34 in the phase 1 and in the phase 2 is represented as (+, +).

Next, when the finger of the operator touches the third location P3, that is a center of the third pair of touch pads (3, 3), the electric charge amplifier 34 outputs 0 V in the phase 1 because there is no difference between corresponding capacitances. The electric charge amplifier 34 also outputs the positive (+) voltage in the phase 2 because the capacitance of the capacitor formed between the excitation pad 31 and the third kind of touch pad 3 is increased. Therefore, the output of the electric charge amplifier 34 in the phase 1 and in the phase 2 is represented as (0, +).

When the finger of the operator touches the fourth location P4, that is a center of the fourth pair of touch pads (3, 2), the electric charge amplifier 34 outputs a negative (−) voltage in the phase 1 because the capacitance of the capacitor formed between the excitation pad 31 and the second kind of touch pad 2 increases. The electric charge amplifier 34 outputs a positive (+) voltage in the phase 2 because the capacitance of the capacitor formed between the excitation pad 31 and the third kind of touch pad 3 is increased. Therefore, the output of the electric charge amplifier 34 in the phase 1 and in the phase 2 is represented as (−, +).

With similar consideration to those as described above, the output of the electric charge amplifier 34 in the phase 1 and in the phase 2 is (−, 0) when the finger of the operator touches the fifth location P5, that is a center of the fifth pair of touch pads (2, 2). When the finger of the operator touches the sixth location P6, that is a center of the sixth pair of touch pads (2, 4), the output of the electric charge amplifier 34 in the phase 1 and in the phase 2 becomes (−, −). When the finger of the operator touches the seventh location P7, that is a center of the seventh pair of touch pads (4, 4), the output of the electric charge amplifier 34 in the phase 1 and in the phase 2 becomes (0, −). When the finger of the operator touches the eighth location P8, that is a center of the eighth pair of touch pads (4, 1), the output of the electric charge amplifier 34 in the phase 1 and in the phase 2 becomes (+, −).

The eight locations P1-P8 can be detected by the outputs of the electric charge amplifier 34 in the phase 1 and in the phase 2 as described above. In other words, the eight locations P1-P8 can be detected with the four inputs CO1-CO4. Therefore, the number of input terminals and the number of wirings can be substantially reduced compared with the conventional touch panel. Note that pairs of touch pads (1, 2) and (3, 4) are not used because the output of the electric charge amplifier 34 is undefined in these cases and these pairs of touch pads do not function in the differential capacitance detection.

Only three values +, 0 and − are used as the output of the electric charge amplifier 34 in detecting the eight locations P1-P8 as described above. Since the electric charge amplifier 34 outputs the analog voltage corresponding to the capacitance difference $\Delta C$ as derived from the equation 5, it is possible to detect more than eight locations when the analog voltage is used.

The detection of more than eight locations will be explained hereinafter in detail. A line connecting between the center of the first pair of touch pads (1, 1) and the center of the fifth pair of touch pads (2, 2) is referred to as a y-axis, as shown in FIG. 6. A line connecting between the center of the third pair of touch pads (3, 3) and the center of the seventh pair of touch pads (4, 4) is referred to as an x-axis. The x-axis and the y-axis intersect orthogonally. Now, an angle formed by the y-axis and a line pointing from an intersection of the x-axis and the y-axis to the touch position of the finger of the operator is denoted by $\theta$. The angle $\theta$ is positive when it represents a clockwise rotation from the y-axis, and is negative when it represents a counterclockwise rotation from the y-axis. The angle $\theta$ defined as described above is referred to as a touch position angle. The electric charge amplifier 34 outputs the first output voltage V1 in the phase 1, and outputs the second output voltage V2 in the phase 2.

Figure 7:
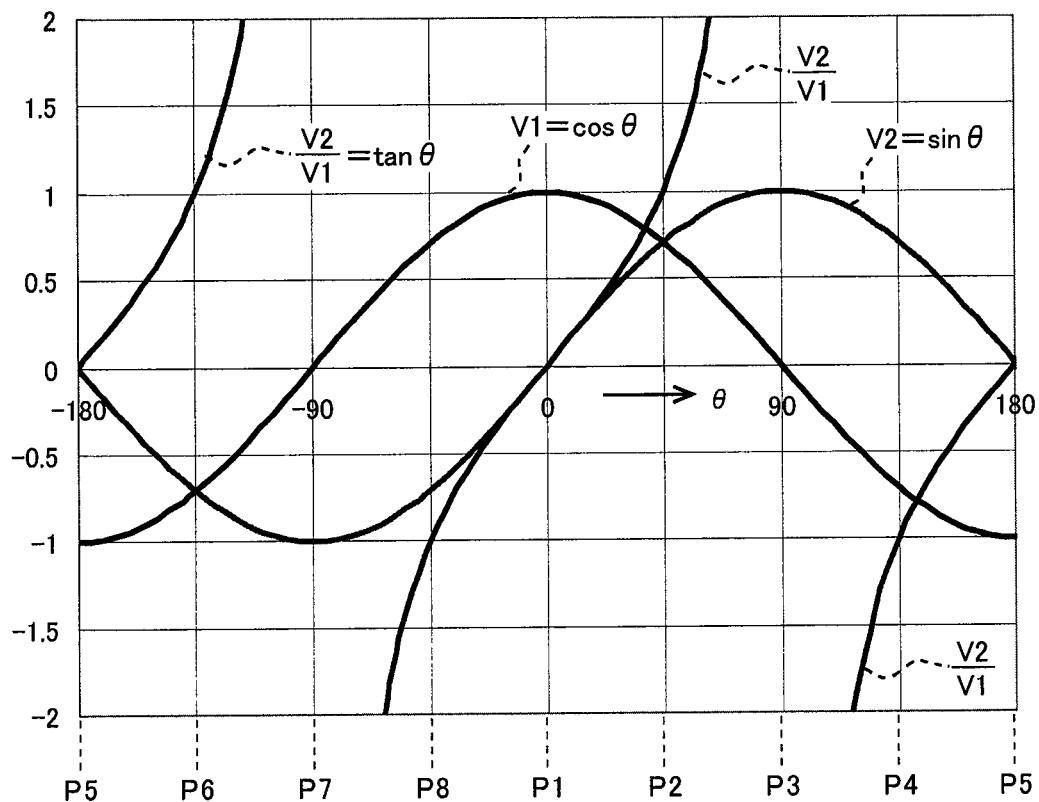
FIG. 7 shows waveforms of outputs of the signal processing circuit for the electrostatic capacitor type touch sensor.
Figure 8:
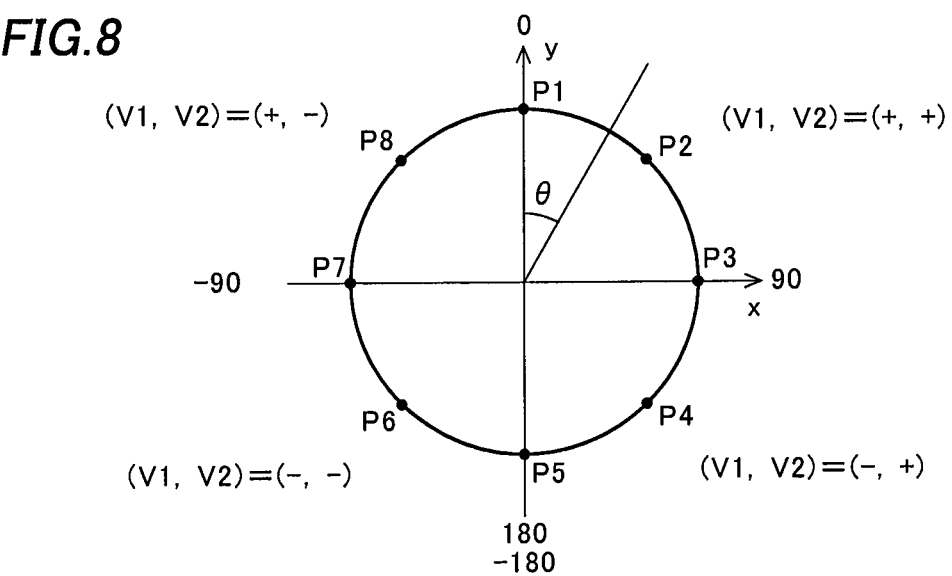
FIG. 8 shows correlation between output voltages of the electric charge amplifier and a touch position angle θ.

Then, the first and second output voltages V1 and V2 of the electric charge amplifier 34 vary continuously in accordance with the change in the touch position angle $\theta$, as shown in FIGS. 7 and 8. In this case, the first output voltage V1 is approximated by $\cos \theta$. On the other hand, the second output voltage V2 is approximated by $\sin \theta$. Here, amplitudes of the output voltages V1 and V2 (coefficients of $\cos \theta$ and $\sin \theta$) are normalized to "1".

For example, a case where $\theta=0°$ corresponds to the first location P1 and the output voltages are represented as (V1, V2)=(1, 0). A case where θ=45° corresponds to the second location P2 and the output voltages are represented as (V1, V2)=(1/√2, 1/√2). A case where θ=90° corresponds to the third location P3 and the output voltages are represented as (V1, V2)=(0, 1). A case where θ=−45° corresponds to the eighth location P8 and the output voltages are represented as (V1, V2)=(1/√2, −1/√2).

The touch position angle θ can be calculated from the output voltages V1 and V2 based on the correlation as described above. In order to calculate the touch position angle θ more efficiently, it is preferable to use V2/V1 that is a ratio of the output voltage V2 to the output voltage V1. V2/V1 is approximated by tan θ. That is, V2/V1=tan θ. Using an inverse function of tan, the touch position angle θ is represented as θ=arctan (V2/V1).

As understood from FIG. 7, it is not possible to determine the touch position angle θ uniquely by a value of V2/V1. For example, the value of V1/V2=tan θ is "1" both at the second location P2 (θ=45° and at the sixth location P6 (θ=−135°). However, the touch position angle θ can be uniquely determined when the polarities (+, −) of the first and second output voltages V1 and V2 are taken into consideration. For example, both of the output voltages V1 and V2 are positive (+) in the polarity at the second location P2. On the other hand, both of the output voltages V1 and V2 are negative (−) in the polarity at the sixth location P6 (Refer to FIG. 8.).

That is, in which of four quadrants in FIG. 8 the touch position angle θ is located can be determined from the polarities of the first and second output voltages V1 and V2. When (V1, V2)=(+, +), 0°<θ<90° holds. When (V1, V2)=(−, +), 90°<θ<180° holds. When (V1, V2)=(+, −), −90°<θ<0° holds. When (V1, V2)=(−, −), −180°<θ<−90° holds. Therefore, as a range of the touch position angle θ is determined based on the first and second output voltages V1 and V2, the touch position angle θ can be uniquely determined from the equation θ=arctan (V2/V1).

An algorithm to calculate θ from the equation θ=arctan (V2/V1) and the polarities of V1 and V2 as described above is executed by an computing unit such as a microcomputer after converting the analog values of the output voltages V1 and V2 of the electric charge amplifier 34 into the digital values by the delta sigma type A/D converter 35 (16-bit converter, for example) that is formed of a switched capacitor circuit. In this case, detection accuracy of the touch position angle θ depends on resolution of the delta sigma type A/D converter 35.

The delta sigma type A/D converter 35 is a circuit using a delta sigma modulator, and can be formed of a switched capacitor circuit as in the case of the electric charge amplifier 34. Thus, efficiency in designing can be improved and a size of the circuit can be reduced through common use of clocks that control turning on/off of the switches (sampling clock or the like) and unification of forms of the circuits. An example of a concrete structure of the delta sigma type A/D converter is disclosed in Japanese Patent Application Publication No. 2009-5050, for example.

Figure 9:
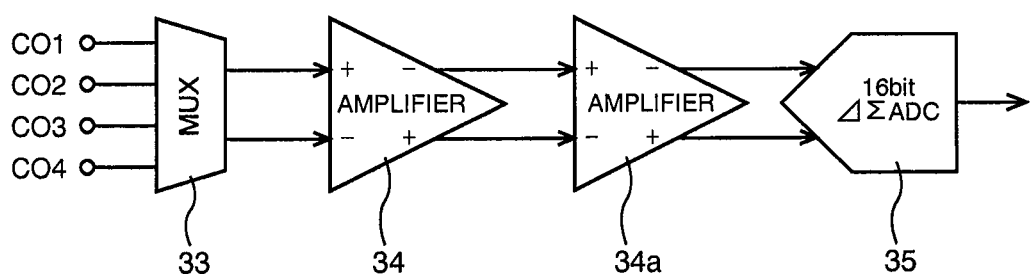
FIG. 9 shows a signal processing circuit for the electrostatic capacity type touch sensor according to the first embodiment of this invention.

In this case, it is preferable that a voltage amplifier 34a to amplify the first and second output voltages V1 and V2 of the electric charge amplifier 34 is provided and that output voltages of the voltage amplifier 34a are inputted to the delta sigma type A/D converter 35, as shown in FIG. 9. The reason is to adjust signal levels of the first and second output voltages V1 and V2 from the electric charge amplifier 34 to an input dynamic range of the delta sigma A/D converter 35.

Figure 10:
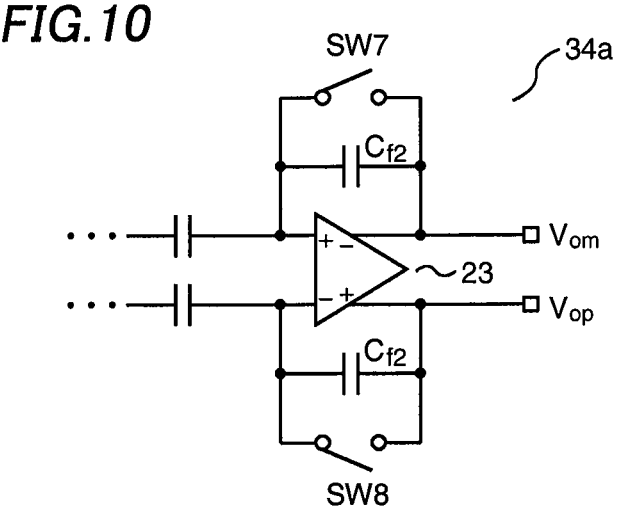
FIG. 10 is a circuit diagram showing a structure of a voltage amplifier.

The voltage amplifier 34a is formed to include a switched capacitor circuit (including switches SW7 and SW8, feedback capacitors Cf2 and the like), that is fundamentally the same as the electric charge amplifier 34, and a differential amplifier 23, as shown in FIG. 10. With this, the electric charge amplifier 34, the voltage amplifier 34a and the delta sigma type A/D converter 35 are unified into the same type of circuit that is the switched capacitor circuit so that the efficiency in designing is further improved and the size of the circuit is reduced.

Figure 11A:
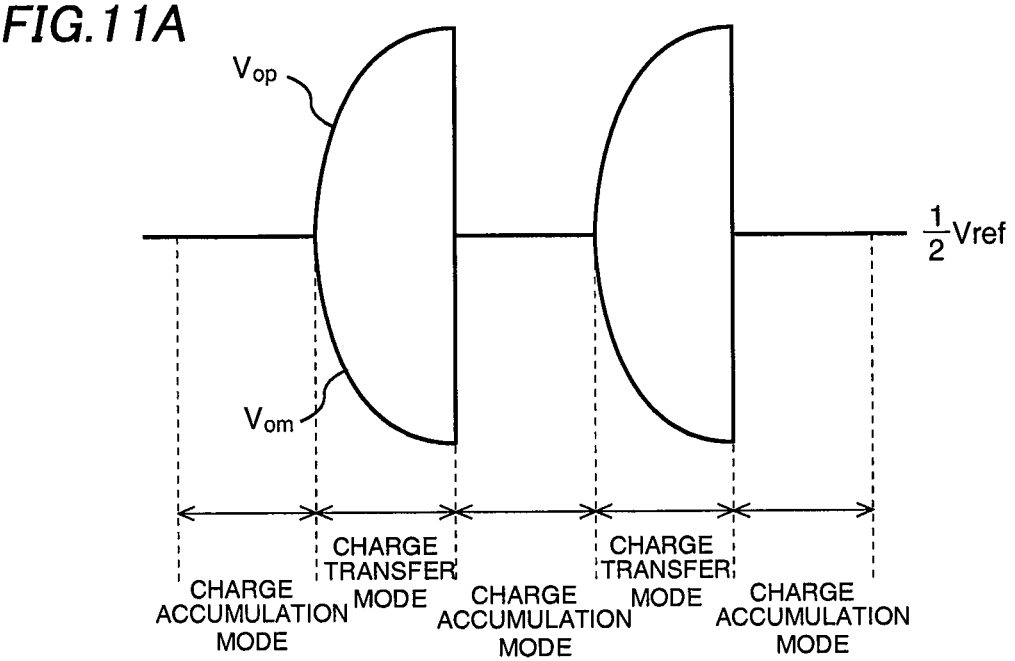
FIGS. 11A and 11B show output waveforms of the voltage amplifier.
Figure 11B:
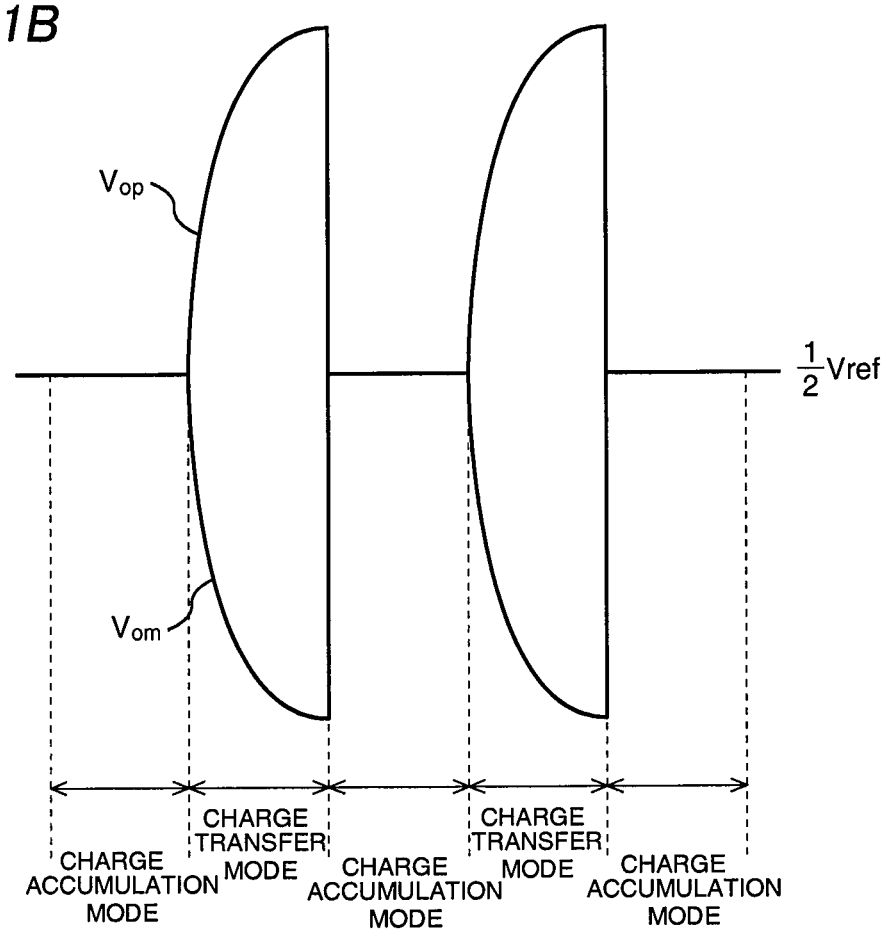

FIGS. 11A and 11B show output waveforms of the electric charge amplifier 34 and the voltage amplifier 34a. The electric charge amplifier 34 has the charge accumulation mode and the charge transfer mode as described above. The electric charge amplifier 34 outputs ½ Vref, which is a half of the excitation voltage Vref, in the charge accumulation mode, and outputs the differential output voltages Vop and Vom in the charge transfer mode, as shown in FIG. 11A. The output voltage of the voltage amplifier 34a remains ½ Vref in the charge accumulation mode and is amplified in accordance with its gain in the charge transfer mode, as shown in FIG. 11B.

Figure 12:
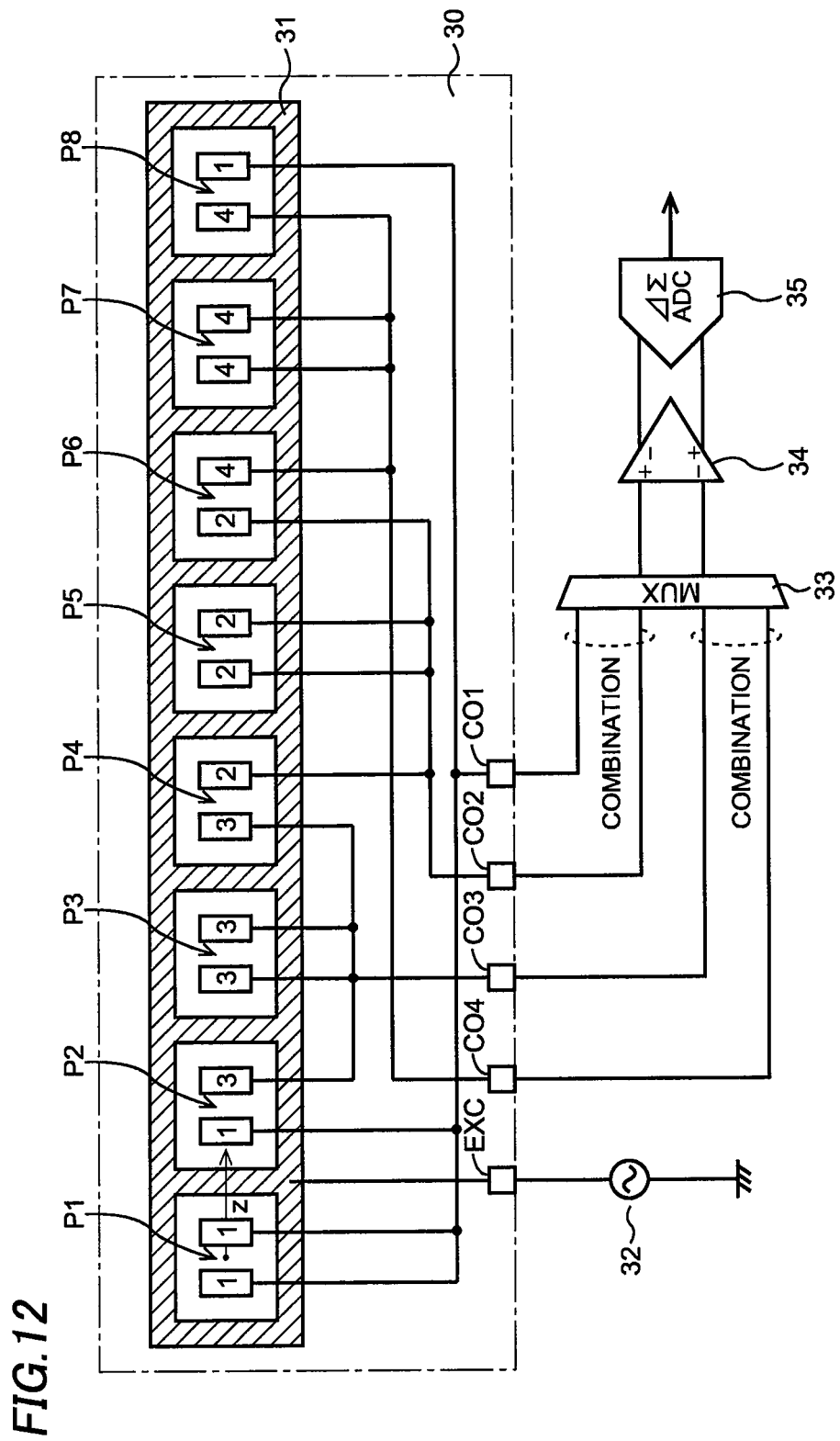
FIG. 12 shows an electrostatic capacity type touch sensor and its signal processing circuit according to a second embodiment of this invention.

While the pairs of touch pads (1, 1), (1, 3), (3, 3), (3, 2), (2, 2), (2, 4), (4, 4), and (4, 1) are arrayed in a ring form in the signal processing circuit according to the first embodiment, identical pairs of touch pads (1, 1), (1, 3), (3, 3), (3, 2), (2, 2), (2, 4), (4, 4), and (4, 1) are arrayed in line in the same order as in the first embodiment, as shown in FIG. 12 in a signal processing circuit according to a second embodiment of this invention. Rest of the structure is the same as in the first embodiment and its operations are also the same as in the first embodiment.

With the signal processing circuit according to the second embodiment, the touch positions can be found also from the first and second output voltages V1 and V2 of the electric charge amplifier 34. That is, taking the first location P1, that is a center of the first pair of touch pads (1, 1), as an origin (z=0), a coordinate of a touch position on a line extending from the origin toward the second location P2 is represented as z. When P1-P8 are equally spaced at intervals of p, for example, the first output voltage V1 is approximated by cos (πz/4p). On the other hand, the second output voltage V2 is approximated by sin (πz/4p). Therefore, the touch position coordinate z can be calculated from z=4p/π arctan (V2/V1) and the polarities of (V1, V2) as in the first embodiment.

Figure 13:
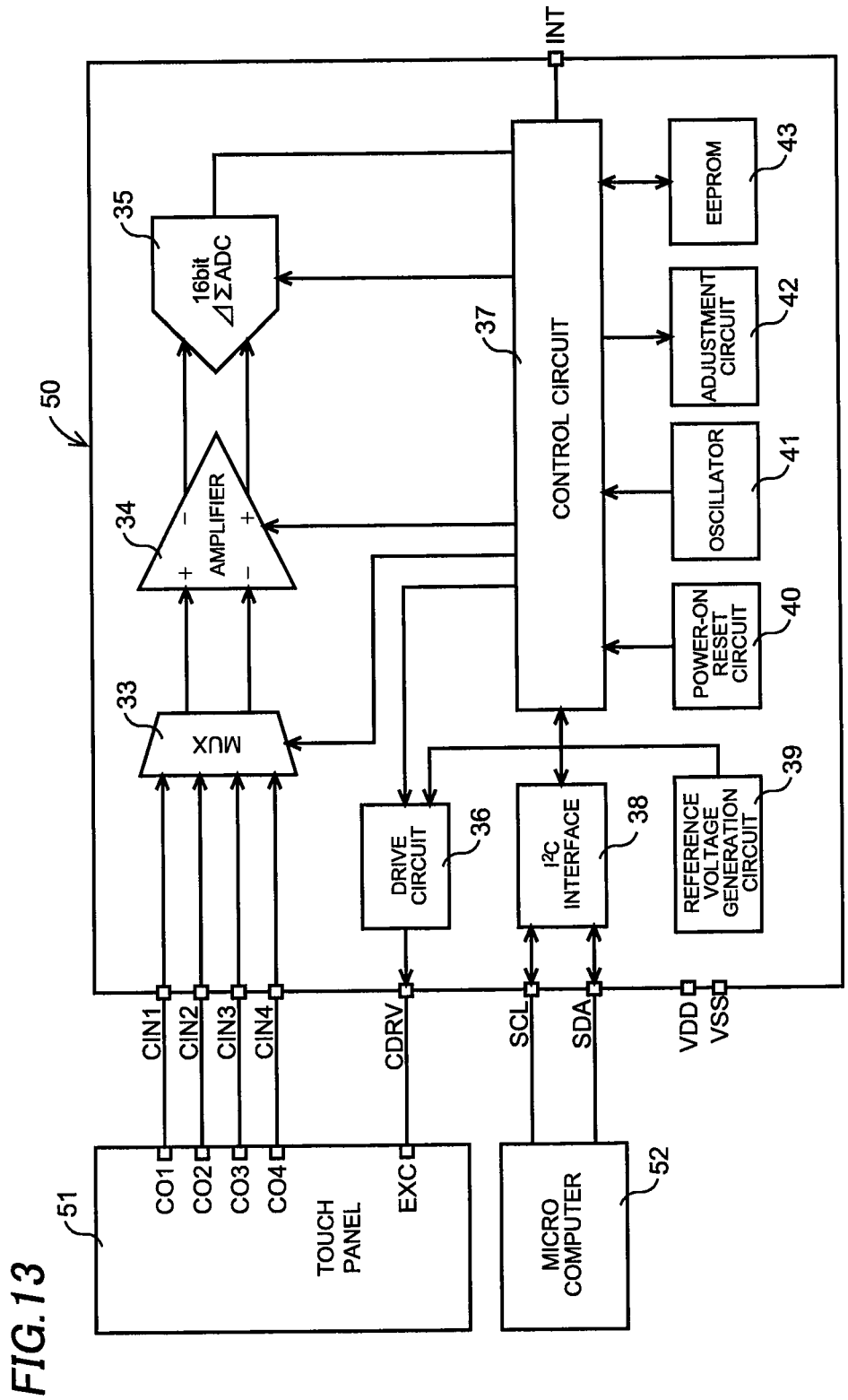
FIG. 13 shows a system structure of the electrostatic capacity type touch sensor and the signal processing circuit.
Figure 14:
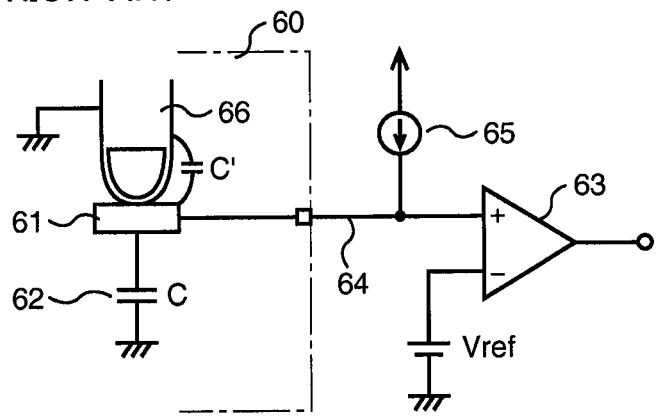
FIG. 14 shows a conventional electrostatic capacity type touch sensor.
Figure 15:
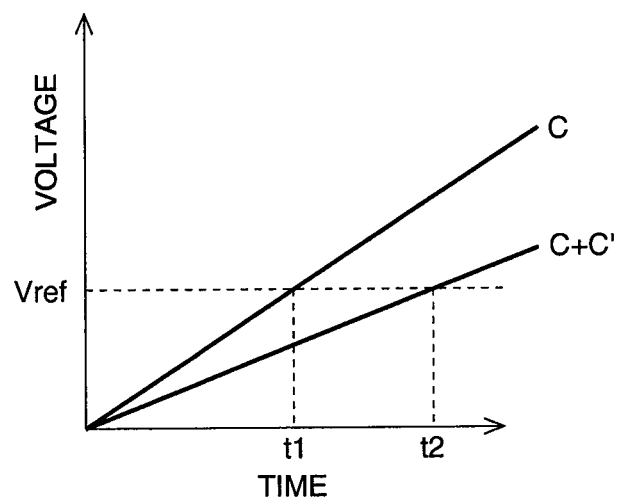
FIG. 15 is to explain operations of the conventional electrostatic capacity type touch sensor.

An example of a structure of a touch sensor system is described hereafter. The touch sensor system is formed to include a signal processing circuit 50, a touch panel 51 and a microcomputer 52 as shown in FIG. 13. The touch panel 51 is identical to the touch panel shown in FIG. 6 or in FIG. 12. The signal processing circuit 50 is structured to include the selection circuit 33, the electric charge amplifier 34, the 16-bit delta sigma type A/D converter 35, a drive circuit 36, a control circuit 37, an I²C interface circuit 38, a reference voltage generation circuit 39, a power-on reset circuit 40, an oscillator 41, an adjustment circuit 42, an EEPROM 43, first through fourth input terminals CIN1-CIN4, a drive terminal CDRV, a serial clock terminal SCL, a serial data terminal SDA, a power supply terminal VDD, a ground terminal VSS and an interrupt terminal INT.

Each of the signals from the first through fourth output terminals CO1-CO4 in the touch panel 51 is inputted to each of the first through fourth input terminals CIN1-CIN4, respectively. The selection circuit 33 selects between the combination of the first and second input terminals CIN1 and CIN2 and the combination of the third and fourth input terminals CIN3 and CIN4.

Outputs of the selection circuit 33 are inputted to the electric charge amplifier 34. The electric charge amplifier 34 outputs the first and second output voltages V1 and V2. The delta sigma type A/D converter 35 converts the first and second output voltages V1 and V2 into the digital values. The control circuit 37 controls whole signal processing circuit 50. Output data of the delta sigma type A/D converter 35 is converted into serial data in a predetermined format by the control circuit 37 and the I²C interface circuit 38, and transmitted to the microcomputer 52 through the serial clock terminal SCL and the serial data terminal SDA.

In this case, the output of the delta sigma type A/D converter 35 is serially transmitted to the microcomputer 52 in synchronization with the serial clock. A program corresponding to the algorithm to calculate the touch position angle θ or the touch position coordinate z on the touch panel 51 as explained in the first and second embodiments is stored in a ROM (Read Only Memory) in the microcomputer 52. The microcomputer 52 calculates the touch position angle θ or the touch position coordinate z on the touch panel 51 by executing the program.

The drive circuit 36 is structured to include the alternating current power supply 32, and provides the excitation terminal EXC in the touch panel 51 with the alternating voltage through the drive terminal CDRV. The reference voltage generation circuit 39 generates the excitation voltage Vref that is used in the drive circuit 36.

The power-on reset circuit 40 resets the system when the power supply is turned on. The oscillator 41 generates a system clock. The adjustment circuit 42 adjusts an amount of offset in the electric charge amplifier 34. The EEPROM 43 is a memory to store adjustment data to adjust the amount of offset.

The noise immunity can be improved with the signal processing circuit for the electrostatic capacity type touch sensor according to the embodiments of this invention, since the differential capacitance detection is adopted. In addition, by detecting the touch positions based on the output voltages of the electric charge amplifier, a larger number of locations can be detected and an amount of data on the touch positions can be significantly increased.

Furthermore, digital computing is made possible by converting the output of the electric charge amplifier from the analog values to the digital values. Especially, by adopting the delta sigma type A/C converter, the A/D converter together with the electric charge amplifier can be formed using the switched capacitor circuit so that the efficiency in designing is improved and the size of the circuit is reduced.

What is claimed is:

1. A signal processing device comprising:
   a touch panel comprising,
   a plurality of pairs of touch pads, each of the touch pads being a first kind of touch pad, a second kind of touch pad, a third kind of touch pad or a fourth kind of touch pad, and each of the pairs of touch pads comprising two touch pads of a same kind or two touch pads of two different kinds, wherein each of the touch pads of the same kind are commonly connected to respective one of a first, second, third, or fourth output, each pair of touch pads arranged on a substrate and neighboring at least one other pair of touch pads and touch pads of different kinds are not commonly connected;
   an excitation pad disposed between neighboring two of the pairs of touch pads; and a signal processing circuit for the touch panel comprising, an alternating current power supply providing the excitation pad with an alternating voltage,
   an electric charge amplifier generating a first output voltage corresponding to a difference between a capacitance of a first capacitor formed between the excitation pad and the first kind of touch pad and a capacitance of a second capacitor formed between the excitation pad and the second kind of touch pad and generating a second output voltage corresponding to a difference between a capacitance of a third capacitor formed between the excitation pad and the third kind of touch pad and a capacitance of a fourth capacitor formed between the excitation pad and the fourth kind of touch pad; and
   a delta sigma type ND converter converting each of the first and second output voltages generated by the electric charge amplifier into a digital value.

2. The signal processing circuit of claim 1, further comprising a selection circuit selecting the first and second kinds of touch pads in a first phase and the third and fourth kinds of touch pads in a second phase, the electric charge amplifier generating the first output voltage in the first phase and generating the second output voltage in the second phase.

3. The signal processing circuit of claim 1, wherein the plurality of pairs of touch pads comprises a first pair of touch pads comprising the first kind of touch pad, a second pair of touch pads comprising the first kind of touch pad and the third kind of touch pad, a third pair of touch pads comprising the third kind of touch pad, a fourth pair of touch pads comprising the third kind of touch pad and the second kind of touch pad, fifth pair of touch pads comprising the second kind of touch pad, sixth pair of touch pads comprising the second kind of touch pad and the fourth kind of touch pad, a seventh pair of touch pads comprising the fourth kind of touch pad and a eighth pair of touch pads comprising the fourth kind of touch pad and the first kind of touch pad.

4. The signal processing circuit of claim 3, wherein first through eighth pairs of touch pads are arranged in order, clockwise, in a circle.

5. The signal processing circuit of claim 3 wherein the first through eighth pairs of touch pads are arranged in order in a line.

6. The signal processing device of claim 1, wherein the plurality of pairs of touch pads are arranged such that each pair of touch pads neighbors at least one other pair of touch pads, the excitation pad is contiguous formed between each neighboring pair of touch pads.

7. The signal processing circuit of claim 1, wherein the electric charge amplifier comprises a first feedback capacitor connected between an inverting output and a non-inverting input, and a second feedback capacitor connected between a non-inverting output and an inverting input, a first switch coupled in parallel with the first feedback capacitor and a second switch coupled in parallel with the second feedback capacitor, and wherein the first and second feedback capacitors have the same capacitance.

8. The signal processing circuit of claim 7, wherein, in each of the first and second phases, the electric charge amplifier is configured first in a charge accumulation mode where the first and second switches are closed, and then in a charge transfer mode where the first and second switches are opened and an output voltage is produced between the inverting output and the non-inverting output.

9. The signal processing circuit of claim 2, wherein, in each phase, the output voltage is either positive, zero, or negative responsive to a touch at one of the plurality of pairs of touch pads, and wherein the signal processing circuit comprises a control circuit that outputs an indication as to whether the output voltage of the electric charge amplifier was positive, zero, or negative in each phase.

10. The signal processing circuit of claim 9, wherein the control circuit normalizes a positive output voltage to a "1" and a negative output voltage to a "−1."

11. A signal processing device comprising:
a touch panel comprising;
a plurality of pairs of touch pads, each of the touch pads being one of either a first kind of touch pad, a second kind of touch pad, a third kind of touch pad or a fourth kind of touch pad, and each of the pairs of touch pads comprising two touch pads of a same kind or two touch pads of two different kinds, wherein each of the touch pads of the same kind are commonly connected to respective one of a first, second, third, or fourth output, each pair of touch pads arranged on a substrate and neighboring at least one other pair of touch pads and touch pads of different kinds are not commonly connected;
an excitation pad disposed between each neighboring pairs of touch pads and connected to an excitation input; and
a signal processing circuit for the touch panel comprising;
an alternating current power supply connected to the excitation input; a multiplexer receiving the first, second, third, and fourth outputs of the touch panel that selectively provides either the first and second outputs in a first phase or the third and fourth outputs in a second phase as first and second outputs of the multiplexer; and
an electric charge amplifier generating a first output voltage corresponding to a difference between the first and second outputs of the multiplexer during the first phase and a second output voltage corresponding to a difference between the first and second outputs of the multiplexer during the second phase; wherein the first output voltage corresponding to a difference between a capacitance of a first capacitor formed between the excitation pad and the first kind of touch pad and a capacitance of a second capacitor formed between the excitation pad and the second kind of touch pad and generating the second output voltage corresponding to a difference between a capacitance of a third capacitor formed between the excitation pad and the third kind of touch pad and a capacitance of a fourth capacitor formed between the excitation pad and the fourth kind of touch pad.

12. The signal processing circuit of claim 11, wherein the plurality of pairs of touch pads comprises a first pair of touch pads comprising the first kind of touch pad, a second pair of touch pads comprising the first kind of touch pad and the third kind of touch pad, a third pair of touch pads comprising the third kind of touch pad, a fourth pair of touch pads comprising the third kind of touch pad and the second kind of touch pad, fifth pair of touch pads comprising the second kind of touch pad, sixth pair of touch pads comprising the second kind of touch pad and the fourth kind of touch pad, a seventh pair of touch pads comprising the fourth kind of touch pad and a eighth pair of touch pads comprising the fourth kind of touch pad and the first kind of touch pad.

13. The signal processing circuit of claim 12, wherein first through eighth pairs of touch pads are arranged in order, clockwise, in a circle.

14. The signal processing circuit of claim 12 wherein the first through eighth pairs of touch pads are arranged in order in a line.

15. The signal processing circuit of claim 11, wherein the electric charge amplifier comprises a first feedback capacitor connected between an inverting output and a non-inverting input, and a second feedback capacitor connected between a non-inverting output and an inverting input, a first switch coupled in parallel with the first feedback capacitor and a second switch coupled in parallel with the second feedback capacitor, and wherein the first and second feedback capacitors have the same capacitance.

16. The signal processing circuit of claim 11, further comprising a voltage amplifier in series with the electric charge amplifier and provides an amplified output of the first and second output voltages to a delta sigma type A/D converter.

17. The signal processing circuit of claim 11, wherein, in each of the first and second phases, the electric charge amplifier is configured first in a charge accumulation mode where the first and second switches are closed, and then in a charge transfer mode where the first and second switches are opened and an output voltage is produced between the inverting output and the non-inverting output.

18. The signal processing circuit of claim 11, wherein, in each phase, the output voltage is either positive, zero, or negative responsive to a touch at one of the plurality of pairs of touch pads, and wherein the signal processing circuit comprises a control circuit that outputs an indication as to whether the output voltage of the electric charge amplifier was positive, zero, or negative in each phase.

19. The signal processing circuit of claim 18, wherein the control circuit normalizes a positive output voltage to a "1" and a negative output voltage to a "−1."

20. A method of forming a signal processing circuit, comprising:
forming a touch panel having a plurality of pairs of touch pads, each of the touch pads being a first kind of touch pad, a second kind of touch pad, a third kind of touch pad or a fourth kind of touch pad, and each of the pairs of touch pads having two touch pads of a same kind or two touch pads of two different kinds;
forming the touch panel to further include an excitation pad disposed between neighboring two of the pairs of touch pads; wherein each of the touch pads of the same kind are commonly connected to respective one of a first, second, third, or fourth output, each pair of touch pads arranged on a substrate and neighboring at least one other pair of touch pads and touch pads of different kinds are not commonly connected;
forming a signal processing circuit for the touch panel to include an alternating current power supply providing the excitation pad with an alternating voltage;
forming the signal processing circuit to include an electric charge amplifier generating a first output voltage corresponding to a difference between a capacitance of a first capacitor formed between the excitation pad and the first kind of touch pad and a capacitance of a second capacitor formed between the excitation pad and the second kind of touch pad and generating a second output voltage corresponding to a difference between a capacitance of a third capacitor formed between the excitation pad and the third kind of touch pad and a capacitance of a fourth capacitor formed between the excitation pad and the fourth kind of touch pad; and
forming the signal processing circuit to further include a delta sigma type A/D converter converting each of the first and second output voltages generated by the electric charge amplifier into a digital value.

* * * * *

UNITED STATES PATENT AND TRADEMARK OFFICE
CERTIFICATE OF CORRECTION

PATENT NO.        : 8,878,812 B2
APPLICATION NO.   : 12/837029
DATED             : November 4, 2014
INVENTOR(S)       : Kazuyuki Kobayashi et al.

Page 1 of 1

It is certified that error appears in the above-identified patent and that said Letters Patent is hereby corrected as shown below:

In the claims:

In claim 1, column 14, line 8, replace "ND" with "A/D".

Signed and Sealed this
Twenty-third Day of February, 2016

Michelle K. Lee
*Director of the United States Patent and Trademark Office*